(12) United States Patent
Fell (10) Patent No.: US 9,677,885 B2
(45) Date of Patent: Jun. 13, 2017

(54) VIBRATORY RING STRUCTURE

(71) Applicant: Atlantic Inertial Systems Limited, Plymouth (GB)

(72) Inventor: Christopher Paul Fell, Dublin (IE)

(73) Assignee: Atlantic Interial Systems Limited (GB)

( * ) Notice: Subject to any disclaimer, the term of this patent is extended or adjusted under 35 U.S.C. 154(b) by 213 days.

(21) Appl. No.: 14/384,469

(22) PCT Filed: Mar. 6, 2013

(86) PCT No.: PCT/GB2013/050542
§ 371 (c)(1),
(2) Date: Sep. 11, 2014

(87) PCT Pub. No.: WO2013/136049
PCT Pub. Date: Sep. 19, 2013

(65) Prior Publication Data
US 2015/0101409 A1    Apr. 16, 2015

(30) Foreign Application Priority Data
Mar. 13, 2012 (GB) .................................. 1204355.0

(51) Int. Cl.
*G01P 15/10* (2006.01)
*G01C 19/5684* (2012.01)
*G01C 19/5677* (2012.01)
*G01C 19/5776* (2012.01)

(52) U.S. Cl.
CPC ..... *G01C 19/5684* (2013.01); *G01C 19/5677* (2013.01); *G01C 19/5776* (2013.01)

(58) Field of Classification Search
CPC .............. G01C 19/567; G01C 19/5677; G01C 19/5684; G01C 19/5776
USPC .......................................... 73/514.15, 514.29
See application file for complete search history.

(56) References Cited

U.S. PATENT DOCUMENTS 5,739,410 A * 4/1998 Fell .................... G01C 19/5691
    73/1.77
2010/0095739 A1* 4/2010 DeNatale ............... G01C 19/56
    73/1.37

FOREIGN PATENT DOCUMENTS

EP    0698779    2/1996
GB    2460935    12/2009

OTHER PUBLICATIONS

Search Report dated Jul. 2, 2012 in UK Application No. GB1204355.0.

(Continued)

Primary Examiner — Benjamin Schmitt
(74) Attorney, Agent, or Firm — Snell & Wilmer L.L.P.

(57) ABSTRACT

A method of tuning a vibratory ring structure includes determining an angular spacing for a pair of fine tuning holes of substantially the same size, located on or near the neutral axis of the vibratory ring structure, the angular offset being selected to reduce to an acceptable level the frequency split between the target normal mode and a further normal mode which is angularly offset relative to the target normal mode, and forming the pair of fine tuning holes in the vibratory ring structure at the determined angular spacing. A ring structure, for example, a gyroscope, tuned or balanced in this manner, is also disclosed.

13 Claims, 5 Drawing Sheets

(56) References Cited

OTHER PUBLICATIONS

Gallacher et al., "Multimodal Tuning of a Vibrating Ring using Laser Ablation"; Proceeding of the Institution of Mechanical Engineers, vol. 217, Part C, Journal of Mechanical Engineering Science, Jan. 1, 2003, pp. 557-576.
International Search Report and Written Opinion dated Jul. 2, 2013 in PCT Application No. PCT/GB2013/050542.

* cited by examiner

VIBRATORY RING STRUCTURE

CROSS-REFERENCE TO RELATED APPLICATIONS

This application is U.S. national phase filing under 35 U.S.C. §371 of PCT/GB2013/050542 filed on Mar. 6, 2013, and claims priority from United Kingdom Application No. GB 1204355.0 which was filed on Mar. 13, 2012, both of which are incorporated herein by reference.

FIELD

This invention relates to a vibratory ring structure of enhanced balance, and to a method of balancing such a vibratory ring structure. The invention further relates to a gyroscope comprising such a vibratory ring structure.

BACKGROUND

Vibrating ring gyroscopes are known in which a ring is vibrated in a primary flexural mode by a primary drive means. Rotation of the gyroscope about the ring axis results in Coriolis coupling of the primary flexural mode into a secondary flexural mode. The vibrations in the secondary mode are detected by a secondary pickoff means and are related to the rotation of the gyroscope. Arrangements are known in which closed loop control is used to both maintain a specific amplitude of the primary mode, and to null the secondary mode.

A cos 2θ in-plane flexural mode is typically used in vibratory ring gyroscopes, with a secondary mode at a 45° angular offset to the primary mode. A geometrically perfect ring consisting of a perfectly isotropic material will have primary and secondary cos 2θ modes that are perfectly matched in frequency and the cos 2θ mode can therefore be excited at any arbitrary orientation. However, in reality, ring structures are not geometrically perfect, and their materials may not be isotropic.

A gyroscope may for example be formed in silicon at a slight angular offset to the [111] crystal plane (in which plane silicon is isotropic), thereby resulting in a cos 4θ variation in Young's Modulus around the ring. An etching process used to form such a silicon gyroscope may be subject to variation across a device, leading to variable trench width, sidewall profile or notching, Differential thermal expansion between the ring structure and the other components to which it is attached may give rise to anisotropic stresses applied to the ring structure. These imperfections give rise to variations in the distribution of mass and/or stiffness throughout the ring. These imperfections will give rise to a normal in-plane cos 2θ mode which is fixed at a specific angle, and a further normal in-plane cos 2θ mode at a 45° angle to the normal mode and which has a higher natural frequency.

The defects described hereinbefore are difficult to control, and it is therefore hard to ensure that the normal cos 2θ modes of the ring coincide with the alignment of the primary and secondary drive and pickoff means. Although the vibrations resulting from excitation of the ring by the primary drive are the superposed response of both of the natural modes of the ring, the resulting vibration tends to be a close approximation of one of the normal modes.

References to the primary and secondary response modes hereinafter refer to the vibrations arising from excitation of the ring by the primary or secondary drive means respectively.

This misalignment between the primary and secondary drive means and the primary and secondary response modes gives rise to quadrature bias error, which may in turn give rise to rate bias errors. Such bias errors are a key performance constraint in gyroscope performance. Although the bias errors vary with temperature, the dominant factor determining bias error is the initial frequency matching and alignment of the normal modes. Furthermore, Coriolis coupling between the primary and secondary modes is improved when the frequency split therebetween is small. A method of tuning vibratory ring structures to match the primary and secondary mode frequencies and to align the normal modes with the primary and secondary drive and sense means is therefore desirable.

A number of methods for tuning vibratory ring structures have been suggested. In EP1775551 a vibratory ring gyroscope is disclosed in which capacitive transducers are used to tune the modes of the ring. U.S. Pat. No. 5,739,410 and GB2460935 disclose methods of tuning a vibratory ring structure by removing or adding material to the neutral axis of the ring, thereby modifying only the effective mass. Similarly, "Multimodal Tuning of a Vibrating Ring using Laser Ablation"; Proceeding of the Institution of Mechanical Engineers Part C, Journal of Mechanical Engineering Science 2003 Jan. 1, Gallacher at al, describes a laser ablation technique for use in tuning of a vibratory ring structure.

A practical method of tuning a vibratory ring structure that is both straightforward to implement, and which enables a high degree of accuracy in matching the primary and secondary mode frequencies is desirable.

SUMMARY

According to the present invention, there is provided a method of tuning a vibratory ring structure comprising determining an angular spacing for a pair of fine tuning holes of substantially the same size, located on or near the neutral axis of the vibratory ring structure, the angular offset being selected to reduce to an acceptable level the frequency split between the target normal mode and a further normal mode which is angularly offset relative to the target normal mode, and forming the pair of fine tuning holes in the vibratory ring structure at the determined angular spacing.

Such an arrangement is advantageous in that it allows balancing of a ring structure to an enhanced degree of accuracy in a simple and convenient manner.

The pair of fine tuning holes are conveniently placed at a substantially equal angular offset from a radial anti-node of the target normal mode. For example, they may be formed substantially symmetrically about a radial anti-node of the target normal mode. The angular offset between the fine tuning holes is preferably less than 45 degrees.

The method is conveniently used in conjunction with a coarse tuning or balancing procedure. For example, the method may include the formation of at least one coarse tuning hole. The coarse tuning hole is preferably of substantially the same size as the fine tuning holes. Consequently, the same apparatus may be used to form both the coarse tuning holes and the fine tuning holes. The tuning holes are conveniently formed by laser ablation.

The method is conveniently used to achieve balancing of the cos 2θ modes.

The invention further relates to a vibratory ring structure tuned using the method defined hereinbefore.

According to another aspect of the invention there is provided a vibratory ring structure comprising a ring body tuned by the formation of a pair of fine tuning holes of substantially the same size, located on or near the neutral axis of the ring body, the fine tuning holes being positioned at an angular offset relative to one another that is selected to reduce to an acceptable level the frequency split between a target normal mode and a further normal mode of the ring body, the further normal mode being angularly offset relative to the target normal mode.

The vibratory ring structure may form part of a gyroscope.

BRIEF DESCRIPTION OF THE DRAWINGS

The invention will further be described, by way of example, with reference to the accompanying drawings, in which.

DETAILED DESCRIPTION

An existing laser tuning or balancing process used to match or reduce the frequency split between the cos 2.theta. modes of a vibrating ring structure comprises removing or ablating material from the neutral axis of the ring, at or near a radial anti-node of the normal mode with the lower frequency. The ring structure includes four such radial anti-nodes, at angular intervals of 90 degrees. Since the orientation and natural frequencies of the primary and secondary response modes approximate the normal modes of the ring structure, the orientation and frequency of the two normal modes can be determined by exciting the ring structure using the primary and secondary drive means respectively.

A pulsed laser may be used which removes a specific, fixed amount of material for each laser 'shot' or application thereof. Using constant laser conditions is advantageous for production, as it ensures a consistent hole profile, and hence that the quanta of material removed in each 'shot' is stable and repeatable. By way of example, the laser may be set up in such a manner that each 'shot' changes the frequency split by approximately 0.4 Hz.

It will be appreciated that material on or near the neutral axis does not contribute to the effective stiffness of either normal mode. Removing mass at a radial anti-node of the target mode will therefore reduce the effective mass, increasing the natural frequency of the target mode without substantially affecting the other mode (which has a radial node at this location). Each quanta of material removed in this way adjusts the split between the normal modes of the ring by a specific amount, and tends to improve the alignment of the primary and secondary response modes with their associated drive and pickoff means. The quantised nature of this tuning process limits the degree to which the modes can be matched to a worst case frequency split of half of the quanta by which the frequency split is adjusted. For example, if each tuning hole reduces the frequency split by approximately 0.4 Hz, the worst case frequency split after tuning will be 0.2 Hz.

Figure 1:
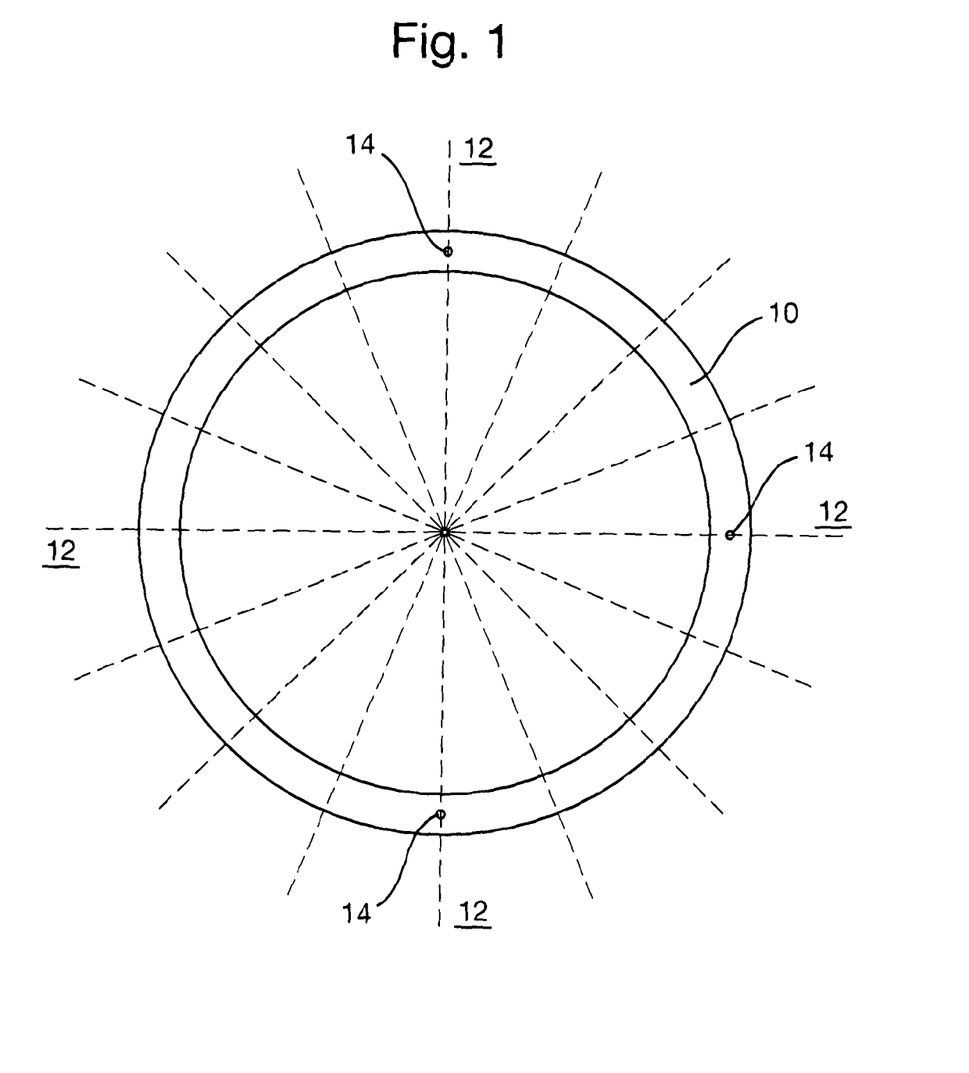
FIG. 1 is a diagram illustrating a ring structure to which a known balancing technique has been applied.

Referring to FIG. 1, in practise, the method used to balance a ring structure 10 employing this technique involves exciting the ring structure 10 using primary and secondary drive means (not shown) to measure the natural frequencies and orientation of the primary and secondary response modes respectively, determining the location of the radial anti-nodes 12 of the target mode, calculating the required number of laser balance holes 14, using a laser to remove mass at (or near) the radial anti-nodes of the target mode by forming the calculated number of balancing holes 14, re-measuring the response mode frequencies and orientation to verify balancing accuracy, and repeating the process if the frequency split remains above a predetermined threshold.

The laser balancing process may be performed at wafer level using fully automated equipment. By way of example, the fabrication process may produce devices which have modes which are matched to within ±5 Hz, and which therefore require up to twelve holes 14, each adjusting the split by 0.4 Hz, to tune or balance the normal modes.

In order to achieve consistency in the laser machining process, it is important to avoid overlap of the holes 14, and they may therefore have a predetermined minimum angular separation. By way of example, the minimum angular separation between adjacent holes 14 may be 1°.

Since there are only four radial anti-nodes 12 of the target mode, to tune devices with a frequency split greater than 1.6 Hz, multiple tuning holes 14 must be placed near at least one of the anti-nodes 12. At least some of the holes 14 are therefore not exactly aligned with a radial anti-node of the target mode but rather are spaced therefrom by a small angle. The tuning effect of such holes 14 will be less than the predetermined tuning quanta that results from the provision of a tuning hole 14 precisely at a radial anti-node 12. This is because the effective mass of the target mode is changed less by the removal of mass at a location with a reduced modal radial displacement magnitude, and because the effective mass of the non-target mode is reduced by holes 14 which are not in alignment with the target radial anti-node 12. Unless the tuning process takes this into account, this variance may lead to an error in tuning.

Figure 2:
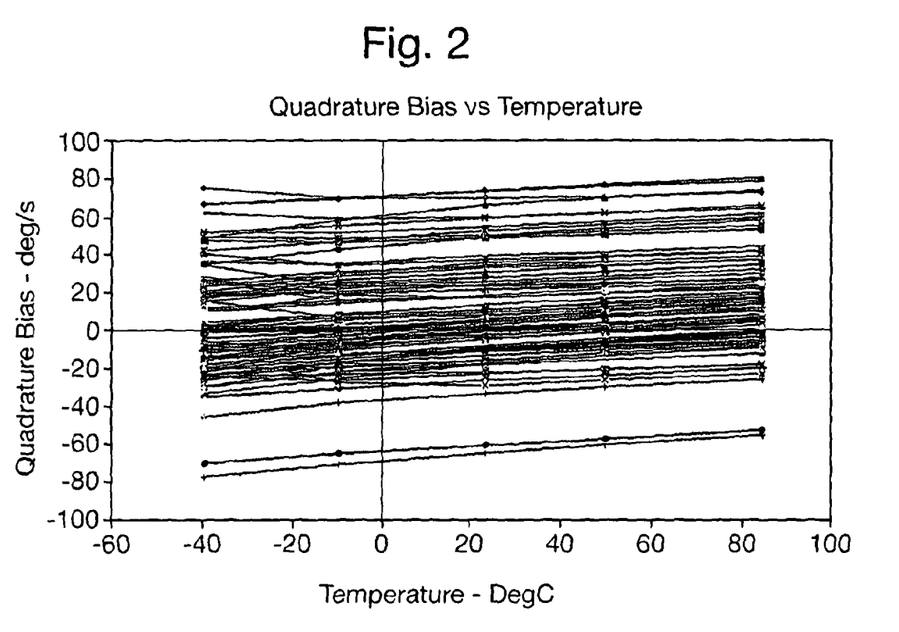
FIG. 2 is a graph showing the variation in quadrature bias over a range of temperatures for a sample of devices.

FIG. 2 shows the variation in quadrature bias for a sample of vibratory ring structures 10 that have been tuned using the method described hereinbefore, over a temperature range from −40 to +85° C. It can be seen that the variation in quadrature bias over this temperature range is typically approximately 20°/s. In contrast, the variation in the initial quadrature bias, after tuning, is up to 80°/s, which illustrates that the quadrature bias for a typical device is dominated by the precision and accuracy (or lack thereof) of the mode tuning that sets the initial quadrature bias.

The need for gyroscopes of this type with improved performance drives a corresponding requirement for improvements in the tuning process. One approach would be to use a final tuning hole of variable size, to thereby achieve a tuning resolution of less than the normal tuning quanta. This would necessitate adjusting the laser power, which is impractical for a number of reasons:

existing equipment may not be able to dynamically adjust laser power;

laser spot size may not be adjustable in existing equipment;

the laser may require time to stabilise to a given operating condition;

mass removal may not vary linearly with laser power; and small adjustments to the frequency split (e.g. <0.1 Hz) may be difficult to achieve with accuracy.

A process which can achieve a high accuracy of tuning using existing equipment is highly preferable.

Figure 3:
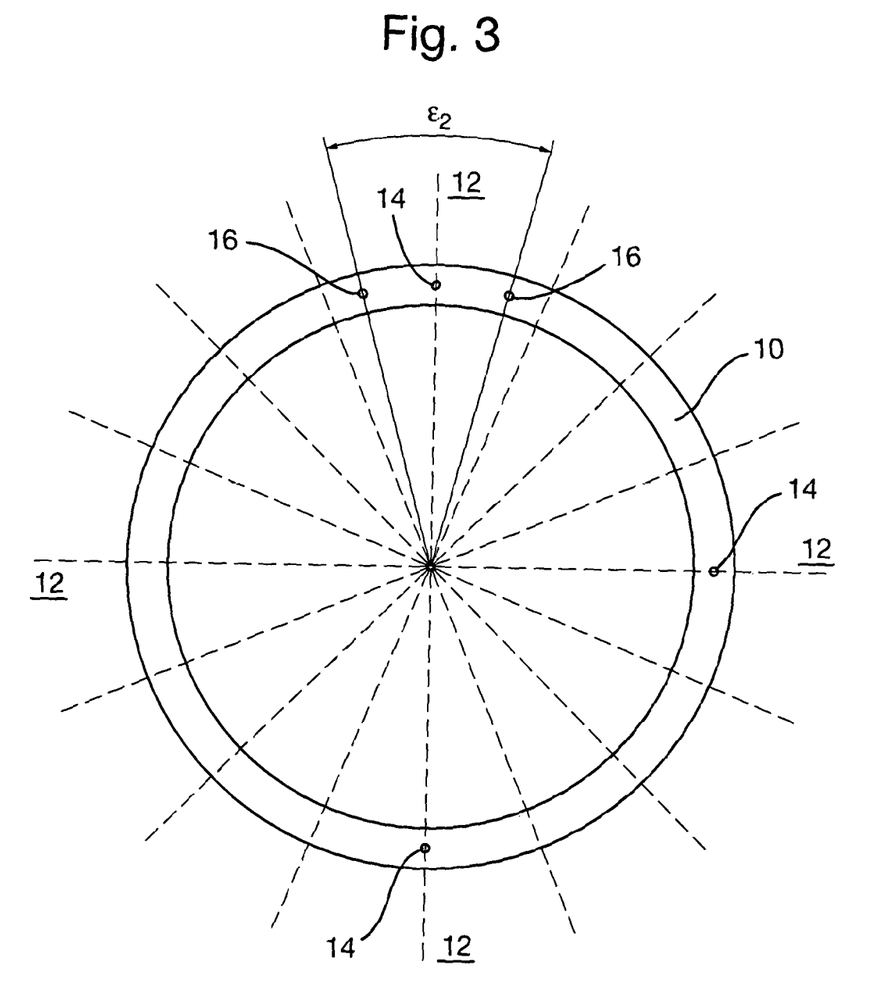
FIG. 3 illustrates the application of a balancing technique in accordance with an embodiment of the invention to the ring structure of FIG. 1.

In accordance with the invention, as shown in FIG. 3, tuning holes 14, referred to hereinafter as coarse tuning holes 14, located at or near the radial anti-nodes 12 may be used as described hereinbefore to reduce the frequency split to a relatively low level and, in addition, a pair of fine tuning holes 16 are placed at predetermined angular offsets from a radial anti-node 12 of the target mode, the angular offset being selected to minimise the frequency split of the natural modes. The pair of fine tuning holes 16 are conveniently substantially equally spaced from the associated radial anti-node 12. Where both holes 16 are associated with the same radial anti-node 12, it will be appreciated that the holes 16 are conveniently substantially symmetrically arranged about that anti-node 12. However, the holes 16 may be associated with different anti-nodes 12, if desired.

Figure 4A:
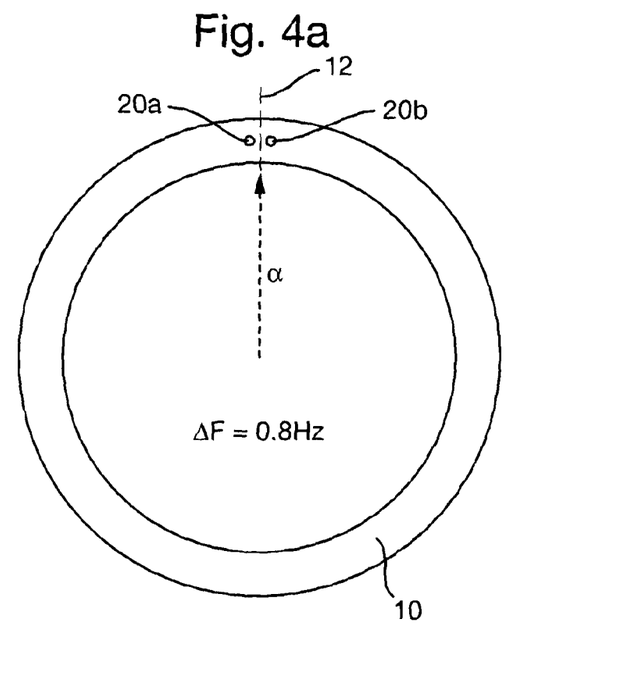
FIGS. 4a and 4b illustrate the removal of material from different locations on a ring structure.
Figure 4B:
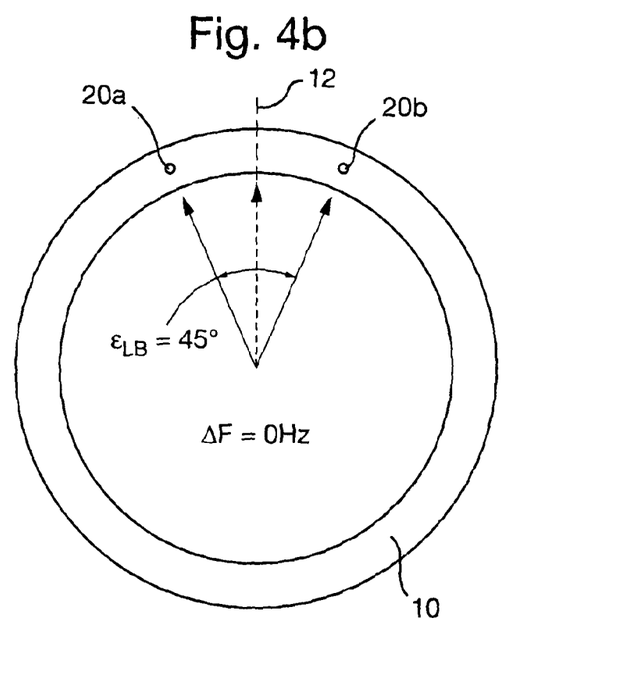
Figure 5:
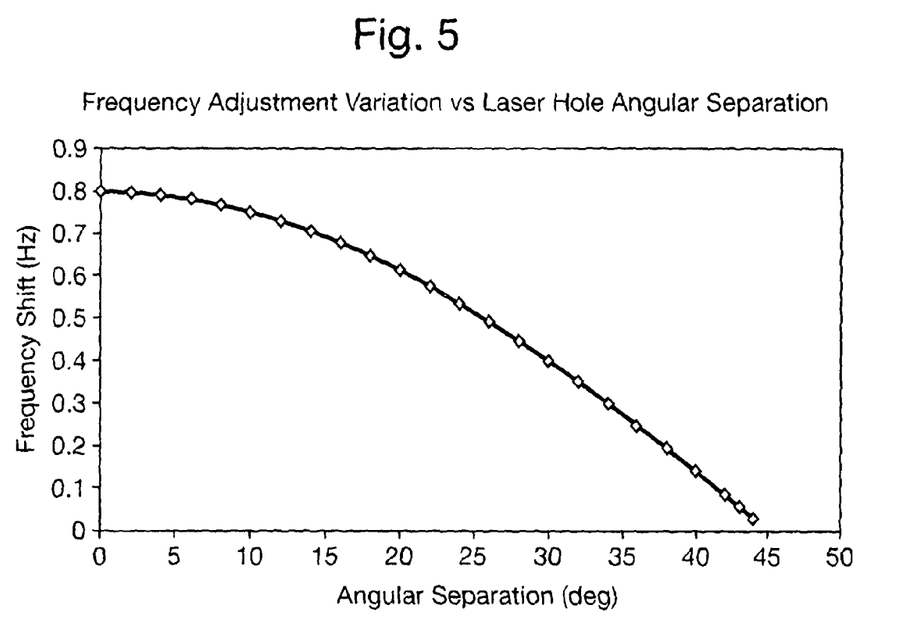
FIG. 5 is a graph illustrating the effect of removal of material from different locations.

As mentioned above it is known that where tuning holes are not located exactly at the radial anti-node 12 positions, the tuning effect of such holes is reduced. If a pair of holes 20a, 20b are both formed at respective anti-nodes 12, and both holes have a 0.4 Hz effect on the frequency split, as shown diagrammatically in FIG. 4a, then the net effect of the holes would be a 0.8 Hz change in the frequency split. If, on the other hand, one hole 20a is formed at the anti-node 12 and a second hole 20b is formed at a position shifted from the anti-node 12 by 45°, as shown diagrammatically in FIG. 4b, the frequency split change arising from the presence of the two holes will be equal and opposite, thus the holes 20a, 20b will have no net effect upon the frequency split. It will be appreciated, therefore, that the provision of a pair of fine tuning holes 16 at appropriately selected angular spacings can be used to assist in balancing of a ring structure with a good degree of accuracy. FIG. 5 shows the shift in frequency split achieved by the provision of a pair of fine tuning holes at a range of angular spacings.

Referring back to FIG. 3, therefore, it will be seen that a series of coarse tuning holes 14 are formed at or near the anti-nodes 12. The coarse tuning holes 14 are used to reduce the frequency split to a value of 0.8 Hz or less. In the example shown in FIG. 3 it is assumed that the initial frequency split of the ring structure 10 is 1.65 Hz. Three coarse tuning holes 14 are provided in this example to reduce the frequency split to approximately 0.45 Hz. It will be appreciated, however, that this is merely an example and that the number of holes 14 provided will depend upon the frequency split of the ring structure prior to commencement of the balancing process. As only three coarse tuning holes 14 are required in this example, they can each be located exactly at a respective anti-node location 12. If more than four such holes 14 were required, then as with the method described hereinbefore some of the holes 14 would have to be spaced slightly from the respective anti-node location 12.

Once the frequency split has been reduced to this relatively low level by the formation of the coarse tuning holes 14, a pair of fine tuning holes 16 is formed to achieve final balancing of the ring structure 10.

The change in frequency split ($\Delta FF_{split}$) resulting from the formation of a pair of fine tuning holes 16 with an angular separation of $\epsilon_2$ is given by:

$$\Delta F_{split} = 2 \cdot \Delta F_{hole} \cdot \cos(2 \cdot \epsilon_2) \quad (1)$$

where $\Delta F_{hole}$ is the nominal change in frequency split that would be achieved by the formation of one of the holes at the anti-node 12.

Referring back to FIG. 3, once the three coarse tuning holes 14 have been formed the response mode frequencies and orientations are re-measured to determine the remaining frequency split. Using equation (1), the required angular separation of the pair of fine tuning holes 16 can be determined to substantially remove the frequency split, or reduce it to an acceptable level. As mentioned above, a frequency split correction of 0.45 Hz is required to achieve balancing of the ring structure. To achieve a shift in the frequency split of 0.45 Hz, the fine tuning holes 16 need to be formed at an angular separation of approximately 28°, as can be seen from FIG. 5, and so the fine tuning holes are required, symmetrically about one of the anti-nodes 12, at an offset therefrom of approximately 14°. Once the required angular spacing has been determined, the pair of fine tuning holes 16 are formed at the required locations to balance the ring structure 10.

In order to prevent the potential for secondary effects arising from asymmetric tuning, it is desirable that the fine tuning holes 16 are symmetric about one of the anti-nodes 12 of the target mode. However, this need not necessarily always be the case, and they could be associated with different anti-nodes 12.

The angular resolution with which tuning holes are placed on the ring may be limited. For example, the equipment used to form the holes may only allow the holes to be formed at 1° angles. Where such equipment is used, then it will be appreciated that exact balancing may not always be possible. However, the degree to which the ring structure 10 can be balanced will be significantly enhanced compared to the use of just the technique described hereinbefore with reference to FIG. 1. To further enhance the accuracy to which balancing is achieved, the requirement for precise symmetry of the fine tuning holes 16 about a target mode radial anti-node 12 may be relaxed, for example to allow the fine tuning hole 16 to one side of the anti-node 12 to be placed at an angle at a 1° variance to the positioning of the fine tuning hole 16 to the opposite side of the anti-node 12, for example to allow fine tuning holes may be placed at +21° and −22° respectively (or vice versa).

Although a process has been described in which the final holes are the fine tuning holes, it will be appreciated that it is the net effect of the tuning holes that is important, not the order in which they are formed, and in some embodiments the fine tuning holes may be formed before the other holes. Furthermore, depending upon the initial balance of the ring structure 10, there may be no need to form any coarse tuning holes 14, and so only the pair of fine tuning holes 16 may be present.

The holes described hereinbefore are not necessarily through holes, and may be relatively shallow ablation craters.

Although the method has been described with reference to $\cos 2\theta$ vibrational modes, it will be appreciated that the method may also be applied to other ring flexural modes such as $\cos 3\theta$ modes. A wide range of modifications and alterations may be made to the arrangements described hereinbefore without departing from the scope of the invention.

The invention claimed is:

1. A method of tuning a vibratory ring structure comprising determining an angular spacing for a pair of fine tuning holes of substantially the same size, located on or near the neutral axis of the vibratory ring structure, an angular offset being selected to reduce to an acceptable level the frequency split between the target normal mode and a further normal mode which is angularly offset relative to the target normal mode, and forming the pair of fine tuning holes in the vibratory ring structure at the determined angular spacing, wherein the pair of fine tuning holes are placed at a substantially equal angular offset from a radial anti-node of the target normal mode.

2. The method according to claim 1, wherein the pair of fine tuning holes are formed substantially symmetrically about a radial anti-node of the target normal mode.

3. The method according to claim 1, wherein the angular offset between the fine tuning holes is less than 45 degrees.

4. The method according to claim 1, further comprising the formation of at least one coarse tuning hole.

5. The method according to claim 4, wherein the coarse tuning hole is of substantially the same size as the fine tuning holes.

6. The method according to claim 1, wherein the tuning holes are formed by laser ablation.

7. The method according to claim 1, wherein the fine tuning holes are positioned so as to achieve balancing of the cos 2θ modes.

8. A vibratory ring structure comprising a ring body tuned by the formation of a pair of fine tuning holes of substantially the same size, located on or near the neutral axis of the ring body, the fine tuning holes being positioned at an angular offset relative to one another that is selected to reduce to an acceptable level the frequency split between a target normal mode and a further normal mode of the ring body, the further normal mode being angularly offset relative to the target normal mode, wherein the pair of fine tuning holes are placed at a substantially equal angular offset from a radial anti-node of the target normal mode.

9. The vibratory ring structure according to claim 8, wherein the pair of fine tuning holes are formed substantially symmetrically about a radial anti-node of the target normal mode.

10. The vibratory ring structure according to claim 8, further comprising at least one coarse tuning hole.

11. The vibratory ring structure according to claim 10, wherein the coarse tuning hole is of substantially the same size as the fine tuning holes.

12. The vibratory ring structure according to claim 8, wherein the fine tuning holes are positioned so as to achieve balancing of the cos 2θ modes.

13. The vibratory ring structure according to claim 8, wherein the ring body forms part of a gyroscope.

\* \* \* \* \*